(12) United States Patent
Weiss

(10) Patent No.: US 9,067,354 B2
(45) Date of Patent: Jun. 30, 2015

(54) APPARATUS FOR THE SHAPING OF PLASTICS MATERIAL PRE-FORMS INTO PLASTICS MATERIAL CONTAINERS WITH MAGNETICALLY ACTUATED LOCKING

(75) Inventor: Johannes Weiss, Nittenau (DE)

(73) Assignee: KRONES AG, Neutraubling (DE)

( * ) Notice: Subject to any disclaimer, the term of this patent is extended or adjusted under 35 U.S.C. 154(b) by 358 days.

(21) Appl. No.: 13/468,290

(22) Filed: May 10, 2012

(65) Prior Publication Data

US 2012/0286455 A1 Nov. 15, 2012

(30) Foreign Application Priority Data

May 11, 2011 (DE) .......................... 10 2011 101 262

(51) Int. Cl.
| | |
|---|---|
| *B29C 49/56* | (2006.01) |
| *B29C 49/06* | (2006.01) |
| *B29C 49/36* | (2006.01) |
| *B29C 49/48* | (2006.01) |

(52) U.S. Cl.
CPC ................. *B29C 49/56* (2013.01); *B29C 49/06* (2013.01); *B29C 49/36* (2013.01); *B29C 2049/4892* (2013.01); *B29C 2049/566* (2013.01)

(58) Field of Classification Search
CPC ................ B29C 49/56; B29C 2049/56; B29C 2049/563
USPC ............................... 425/3, 541, 182, 195, 522
See application file for complete search history.

(56) References Cited

U.S. PATENT DOCUMENTS

| | | | |
|---|---|---|---|
| 2010/0109207 A1* | 5/2010 | Rousseau et al. .................. | 425/3 |
| 2010/0156009 A1 | 6/2010 | Voth et al. | |
| 2011/0049742 A1* | 3/2011 | Senn ............................. | 425/144 |
| 2011/0052747 A1* | 3/2011 | Meinzinger ................... | 425/541 |

FOREIGN PATENT DOCUMENTS

| | | |
|---|---|---|
| CN | 101890805 | 11/2010 |
| DE | 299 13 182 U1 | 10/2000 |
| DE | 10 2009 007 717 A1 | 8/2010 |
| EP | 2130663 | 12/2009 |
| EP | 1048435 | 11/2011 |
| RU | 2184654 | 7/2002 |

OTHER PUBLICATIONS

Extended Search Report from parallel EP application 12 16 7262, dated Sep. 29, 2014.

* cited by examiner

*Primary Examiner* — Timothy Kennedy
(74) *Attorney, Agent, or Firm* — Greer, Burns & Crain, Ltd.

(57) ABSTRACT

An apparatus is provided for the shaping of plastic pre-forms into containers with at least one blow moulding station arranged on a movable carrier, and having a blow mould carrier, a first blow mould carrier part and a second blow mould carrier part which is pivotable relative to the first blow mould carrier part to open and close the blow mould. The blow moulding station additionally has a locking mechanism to lock the first blow mould carrier part with respect to the second blow mould carrier part, and the locking mechanism has a first locking element on the first blow mould carrier part, and a second locking element on the second blow mould carrier part, for locking the carrier parts. A first magnetic element is movable relative to the first locking element and causes a movement of the first locking element by a magnetic interaction to lock the carrier parts.

8 Claims, 4 Drawing Sheets

APPARATUS FOR THE SHAPING OF PLASTICS MATERIAL PRE-FORMS INTO PLASTICS MATERIAL CONTAINERS WITH MAGNETICALLY ACTUATED LOCKING

BACKGROUND

The present invention relates to an apparatus for the shaping of plastics material pre-forms into plastics material containers. Apparatus of this type have long been known from the prior art. In this case it is customary for heated plastics material pre-forms to be expanded by means of a gaseous medium, and in particular by means of compressed air, to form plastics material containers. For this purpose the plastics material pre-forms are introduced into a blow mould and are then acted upon with compressed air, in particular by way of their aperture. This means that during the expansion procedure the blow mould too is subjected to considerable forces. It is therefore likewise known from the prior art for a locking mechanism to be provided which locks the blow mould halves to each other at least during the expansion procedure. In order to actuate this locking mechanism it is customary in the prior art for guide cams to be provided, along which guide rollers run, in which case a locking element is moved by this movement.

In addition, an electrically driven blow moulding machine and a corresponding blow moulding process are known from EP 2 199 061.

With this machine a drive by an electric motor is provided for actuating the locking elements.

SUMMARY

The object of the present invention is to simplify the locking mechanisms known from the prior art, in order for example to be able to dispense with the lubricated rollers usually necessary in the prior art.

An apparatus according to the invention for the shaping of plastics material pre-forms into plastics material containers has at least one blow moulding station arranged on a movable carrier, this blow moulding station having a blow mould carrier for holding a blow mould and this blow mould carrier having a first blow mould carrier part and a second blow mould carrier part, this second blow mould carrier part being pivotable with respect to the first blow mould carrier part about a pre-set first pivot axis in order to open and close the blow mould. In addition, the blow moulding station has a locking mechanism in order to lock the first blow mould carrier part with respect to the second blow mould carrier part, and the locking mechanism has a first locking element, arranged at least indirectly on the first blow mould carrier part, and a second locking element, arranged at least indirectly on the second blow mould carrier part, in which case the locking elements co-operate in a locked state of the blow mould carrier parts.

According to the invention the apparatus has a first element which is magnetic at least for a time and with respect to which the first locking element is movable and which causes a movement of the first locking element by a magnetic interaction without contact in order to lock the blow mould carrier parts.

It is therefore proposed to provide, with the aid of an element which is magnetic at least for a time, for example an electromagnet, a solution without contact which is thus free from friction and maintenance-free, in order to carry out the locking of the blow mould. It is advantageous for the first locking element to be pivotable about a pre-set pivot axis. It is particularly preferred for a maximum pivot angle of the first locking element to be between 3° and 40°, preferably between 5° and 35° and in a particularly preferred manner between 5° and 30°. This second pivot axis, about which the first locking element is pivotable, preferably extends substantially parallel to the pivot axis about which the blow mould carrier part is pivotable. In this case "substantially" is understood to mean that a tilting angle between these two pivot axes is smaller in magnitude than 15°, preferably smaller than 10°, preferably smaller than 5°.

It is advantageous for the magnetic element to be arranged in a stationary manner with respect to the blow moulding station, for example on a stationary carrier. In this case it is possible for the magnetic element to be activated in each case when the locking element is to be used for locking. The magnetic element can also, however, be permanently activated in working operation. It would also be possible, however, for the magnetic element to be moved with the blow moulding station and to be activated in each case when the blow moulding station is to be locked.

In the case of a further advantageous embodiment the magnetic element has an electromagnet.

It is advantageous for a second magnetic element, which holds the locking element for a time in a locking position, to be provided on the blow moulding station. In this case this second magnetic element can be used as a safety means in order to secure the locking state of the blow mould. It would also be possible, however, for a mechanically acting locking means to be provided which maintains a locking state. It is advantageous, however, for this second magnetic element to be a permanent magnet. This second magnetic element advantageously moves jointly with the blow moulding station and in a particularly preferred manner it is arranged stationary on one of the blow mould carrier parts.

In the case of a further advantageous embodiment a third magnetic element which holds the locking element at least for a time in a non-locked position is provided, in particular on the blow moulding station. By means of this third magnetic element it is possible to prevent the locking mechanism from inadvertently moving into a locked state and for example blockages of the blow moulding station from being able to occur in this way.

In the case of a further advantageous embodiment the apparatus has a movement generation element which, in particular, is arranged so as to be stationary and which moves the locking element. In particular, the locking element is moved in this case by a mechanical contact. This movement generation element advantageously acts as a safety mechanism if the magnetic closure mechanism breaks down. In this case it is advantageous for this movement generation element to be arranged in a position which is situated downstream of the magnetic element in the direction of movement of the blow moulding station or in a position in which the locking would already have been terminated in defect-free operation. In this way, it is advantageous for this movement generation element to be used only if the locking means has not already been closed in the proper manner by the magnetic element. As a rule, therefore, an engagement of the movement generation element does not take place. It would also be possible for the apparatus to have a further movement generation element which unlocks the locking mechanism if a corresponding magnetic unlocking means breaks down.

In the case of a further advantageous embodiment the apparatus has a second element which is magnetic at least for a time and with respect to which the first locking element is movable and which causes a movement of the first locking element by a magnetic interaction in order to unlock the blow mould carrier parts. It is therefore proposed that the unlocking of the blow moulding station or the blow mould carriers respectively should also be carried out in a magnetic manner and thus, in particular, without contact.

It is advantageous for the first magnetic element and the fourth magnetic element to be arranged at different locations along the movement path of the blow moulding station. This is due to the fact that the opening and closing of the blow moulding station and also the locking and unlocking also take place at different positions of the blow moulding station with respect to the conveying path thereof.

In the case of a further advantageous embodiment the apparatus has a clean room inside which the blow moulding station is conveyed, it being advantageous for this clean room to be separated or to be arranged separately from the surroundings by means of at least one wall. It is advantageous in this case for a clean room in the manner of a duct to be provided, which surrounds the blow moulding station. In the case of a further advantageous embodiment a plurality of advantageously similar blow moulding stations are arranged on the movable carrier. In this case these blow moulding stations are all advantageously conveyed through the aforesaid clean room. It is advantageous for at least one wall also to form a wall which bounds the clean room.

The magnetic element can be arranged in this case outside the aforesaid clean room, but it would also be possible for the magnetic element to be provided for example on a wall which bounds the clean room. It is advantageous in this case for at least one wall which bounds the clean room to be movable with respect to a second wall which bounds the clean room. It is particularly advantageous in this case for sealing devices to be capable of being provided which seal movable walls of the clean room off from immovable walls of the clean room, for example in the manner of so-called surge chambers.

The present invention further relates to a method of shaping plastics material pre-forms into plastics material containers, the plastics material pre-form being shaped to form the plastics material container in a blow moulding station arranged on a movable carrier, and the blow moulding station having a first blow mould carrier part—pivotable with respect to a first pivot axis—and a second blow mould carrier part, the first blow mould carrier part and the second blow mould carrier part being locked with respect to each other by means of a locking mechanism, and a first locking element performing a (pivoting) movement (in particular with respect to a pivot axis) in order to lock the blow mould carrier parts. According to the invention the first locking element is forced without contact into a locking position by a magnetic force.

In the case of a preferred method the magnetic force is generated by a magnetic element which is arranged so as to be movable with respect to the first locking element and preferably also the blow moulding station. It is advantageous for the aforesaid magnetic element to be arranged in a stationary manner. Instead of a pivoting movement, however, the locking element could also carry out a displacement movement and, in particular, a smaller displacement movement in order to lock the blow mould carrier parts. In this way, the locking element could also be designed for example in the form of a body in the manner of a rod or pin which for locking purposes engages in corresponding recesses or holes which are arranged in a fixed manner with respect to the other blow mould carrier part in each case.

BRIEF DESCRIPTION OF THE DRAWINGS

Further advantages and embodiments may be seen in the accompanying drawings. In the drawings

DETAILED DESCRIPTION

Figure 1:
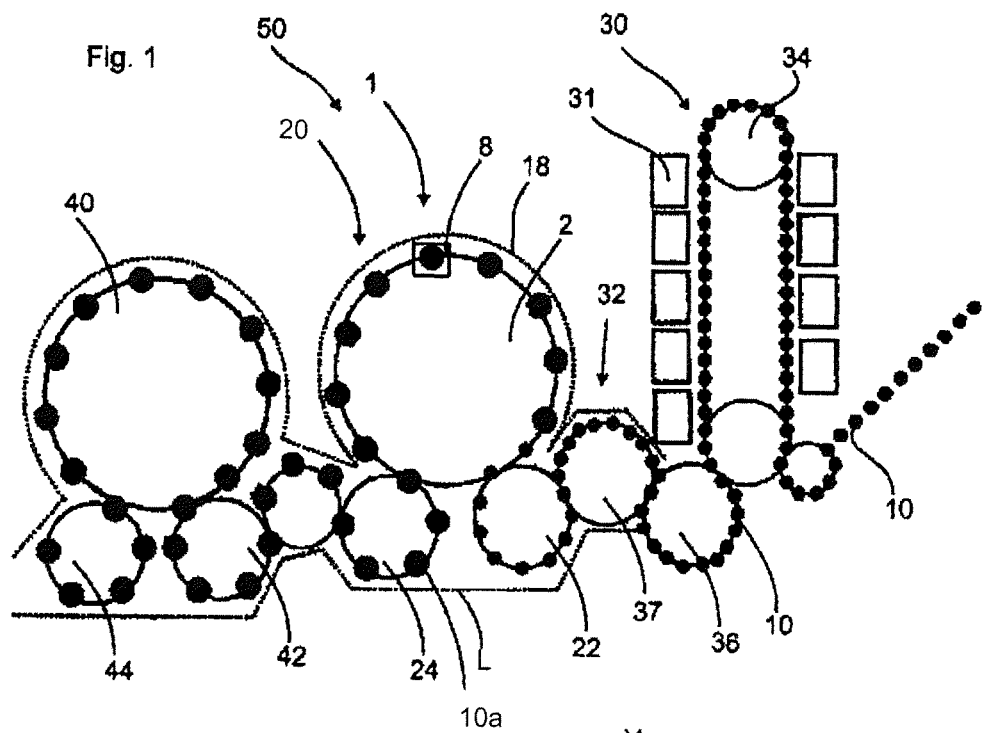
FIG. 1 is a diagrammatic illustration of a plant for the production of plastics material containers.

FIG. 1 is a diagrammatic illustration of a plant for the production of plastics material containers. This plant 50 has a heating device 30 in which plastics material pre-forms 10 are heated. In this case these plastics material pre-forms 10 are conveyed through this heating device 30 by means of a conveying device 34, such as a circulating chain here, and are heated in this case by a plurality of heating elements 31. This heating device 30 is followed by a transfer unit 36 which transfers the pre-forms 10 to a sterilization device 32. This sterilization device 32 likewise has in this case a conveying wheel 37 and sterilization elements can be arranged on this conveying wheel 37 or in a stationary manner. In this region, sterilization by hydrogen peroxide gas or even by electromagnetic radiation for example is possible. In particular, an internal sterilization of the pre-forms is carried out in this region.

The reference number 20 designates a clean room in its entirety, the external boundaries of which are indicated here by the dotted line L. In a further preferred embodiment the clean room 20 is not only arranged in the region of the conveying wheel 2 and the filling device 40, but it usually starts if possible in the region of the heating device 30, the sterilization device 32, the supply of the plastics material pre-forms and/or the production of the plastics material pre-forms. It is evident that this clean room 20 starts in the region of the sterilization unit 32. Separating-out devices can be provided in this region in order to introduce the plastics material pre-forms into the clean room 20, without too much gas flowing inside the clean room and thus being lost in this case.

As indicated by the broken line L, the clean room is adapted to the external shape of the individual components of the unit. In this way the volume of the clean room can be reduced.

The reference number 1 designates a shaping apparatus as a whole, in which a plurality of blow moulding stations or shaping stations 8 are arranged on a conveying wheel 2, only one of these blow moulding stations 8 being shown here. The plastics material pre-forms 10 are expanded by these blow moulding stations 8 to form containers 10a. Although it is not shown in detail here, the entire area of the conveying device 2 is not situated inside the clean room 20, but the clean room 20 or isolator is designed as it were in the form of a mini isolator inside the apparatus as a whole. In this way it would be possible for the clean room to be designed in the form of a duct at least in the region of the shaping apparatus 1.

The reference number 22 relates to a supply device which transfers the pre-forms to the shaping device 1, and the reference number 24 relates to a removal device which removes the plastics material containers 20 produced from the shaping apparatus 1. It will be seen that in the region of the supply device 22 and the removal device 24 the clean room 20 has recesses in each case which receive these devices 22, 24. In this way, a transfer of the plastics material pre-forms 10 to the shaping apparatus 1 or a receiving of the plastics material containers 10a from the shaping apparatus 1 can be carried out in a particularly advantageous manner.

The expanded plastics material containers are transferred to a filling device 40 by a transfer unit 42 and they are then removed from this filling device 40 by way of a further conveying unit 44. In this case the filling device 40 is also situated inside the aforesaid clean room 20. In the case of the filling device it would also be possible for the entire filling device 40 with for example a reservoir for a beverage not to be arranged completely inside the clean room 20, but also in this case only those areas in which the containers are actually guided. In this respect, it would also be possible for the filling device to be designed in a similar manner to the apparatus 1 for shaping plastics material pre-forms 10.

As mentioned, the clean room 20 is reduced in the region of the apparatus 1 to as small an area as possible, namely essentially to the blow moulding stations 8 themselves. As a result of this compact design of the clean room 20 it is possible in an easier and more rapid manner to produce a clean room generally and, in addition, a lower outlay is required in order to keep the system sterile in the operative phase. Less sterile air is also necessary, and this leads to smaller filter units and the risk of uncontrolled swirl formation is also reduced.

Figure 2:
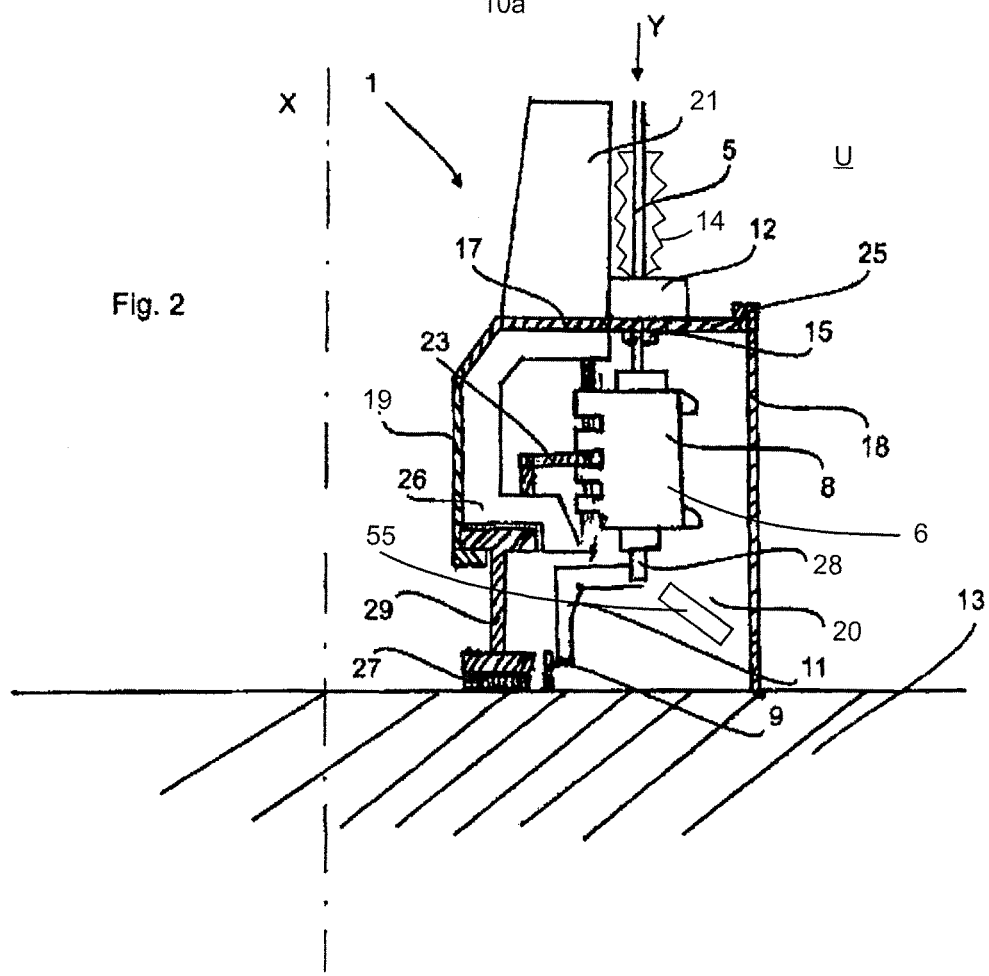
FIG. 2 is a view of a clean room in the region of a blow moulding station.

FIG. 2 is a detailed illustration of the apparatus 1 in the region of a blow moulding station 8. A plurality of blow moulding stations 8 of this type is moved by a conveying device 2 or a carrier so as to rotate about an axis X. As is evident from FIG. 2, the blow moulding station 8 is guided inside the clean room 20 which is designed in the form of a duct here. This clean room 20 is closed off by a movable lateral wall 19 and a cover 17 formed in one piece with this lateral wall 19. In this case this lateral wall 19 and the cover 17 rotate jointly with the blow moulding station 8.

The reference number 18 relates to a further wall which bounds the clean room 20. This wall 18 is here a wall which is situated on the outside and which is arranged in a stationary manner. The cover 17 and the wall 18 have provided between them a sealing device 25 which seals off from each other the elements 17 and 18 movable with respect to each other, for example, as mentioned above, by using a surge chamber. The lower region of the wall 18 is arranged on a floor 13 in a fixed and sealed manner. A carrier 26, which likewise moves in a rotating manner and on which a holding device 23 which holds the blow moulding station 8 is in turn provided, is provided inside the clean room 20 and in this case abutting directly against the wall 19.

The reference number 11 relates to a follower device which can be actuated by a guide cam 9 in order to open and close the blow moulding station on its path through the clean room 20, in order in particular to introduce the plastics material preform into the blow moulding station and also to remove it therefrom again. In this case a guide cam 9 is also arranged inside the clean room 20. It would also be possible, however, for a portion 11 below the individual blow moulding stations 8 to be brought out of the clean room 20.

The conveying device 2 can have still further elements which are arranged above the clean room 20.

In this case the carrier 26 is arranged in a fixed manner on a holding body 29 and this holding body in turn is movable with respect to the floor 13. In this case the reference number 27 relates to a further sealing device which in this area too seals off the regions 13 and 29 which are movable with respect to each other.

The reference number 5 relates to a stretch bar which is movable with respect to the blow moulding station in order to stretch the plastics material pre-forms 10 in their longitudinal direction. In this case a slide 12 opposite which the stretch bar is movable in the direction Y is arranged on the cover 17. The reference number 21 relates to a further holding means for this slide 12 of the stretch bar 5.

It is evident that specific regions of the stretch bar are both outside the clean room 20 and inside the clean room 20 during the blow moulding procedure. For this purpose it is possible for a protective device such as a folding bellows 14 to be provided outside the clean room 20 or above the slide 12, the folding bellows 14 surrounding the stretch bar 5 so that no region of the stretch bar 5 comes directly into contact with the outer environment. The reference letter U designates the (nonsterile) environment of the clean room 20. The reference number 28 designates a carrier for carrying a floor mould which likewise forms a component of the blow mould 4. This carrier is likewise movable in the direction Y in this case.

The reference number 55 relates to a sterilization device which in this case is preferably arranged in the interior of the clean room 20 and is used for the sterilization of the individual shaping stations or components of these shaping stations 8.

This sterilization device 55 can act in this case upon the shaping stations 8 for example with hydrogen peroxide or another sterilization agent. In this case the sterilization device 55 can be arranged so as to be stationary and the shaping stations can move with respect to this sterilization device 55. This sterilization device or stressing device 55 can be situated on the conveying wheel 2 or on the vertical wall 18 or can be arranged so as to be generally stationary and can consist of nozzles or the like. In addition, it is advantageous for sterile air to be introduced into the clean room 20 in order to sterilize the clean room 20 by way of the aeration system.

The blow moulds (not shown) are arranged inside the blow mould carrier 6. More precisely, two blow mould carrier parts can be provided in this case which are pivotable with respect to each other and which hold one blow mould part in each case. The blow moulds can be opened by this pivoting procedure for the introduction of plastics material pre-forms and for the removal of finished, blow-moulded containers. These blow mould carriers and blow moulds are likewise arranged inside the clean room in this case.

It would also, however, be possible and preferred (other than as shown in FIG. 2) for the conveying device 2 or the carrier to have a C-shaped external periphery which also forms the outer walls of the clean room in part. In this way, this C-shaped clean room wall rotates with the conveying device 2, i.e. the blowing wheel. In this embodiment the lower boundary of the clean room is arranged at a distance from the floor 13 and moves relative to the floor. In this way, the clean room can be made even smaller than as shown in FIG. 2. In this case it is preferable for this C-shaped profile of the conveying device, which forms both an inner wall and a lower and upper cover of the clean room here, to be sealed off only with respect to the outer wall of the clean room. This outer wall is preferably arranged in a stationary manner in this case.

Figure 3A:
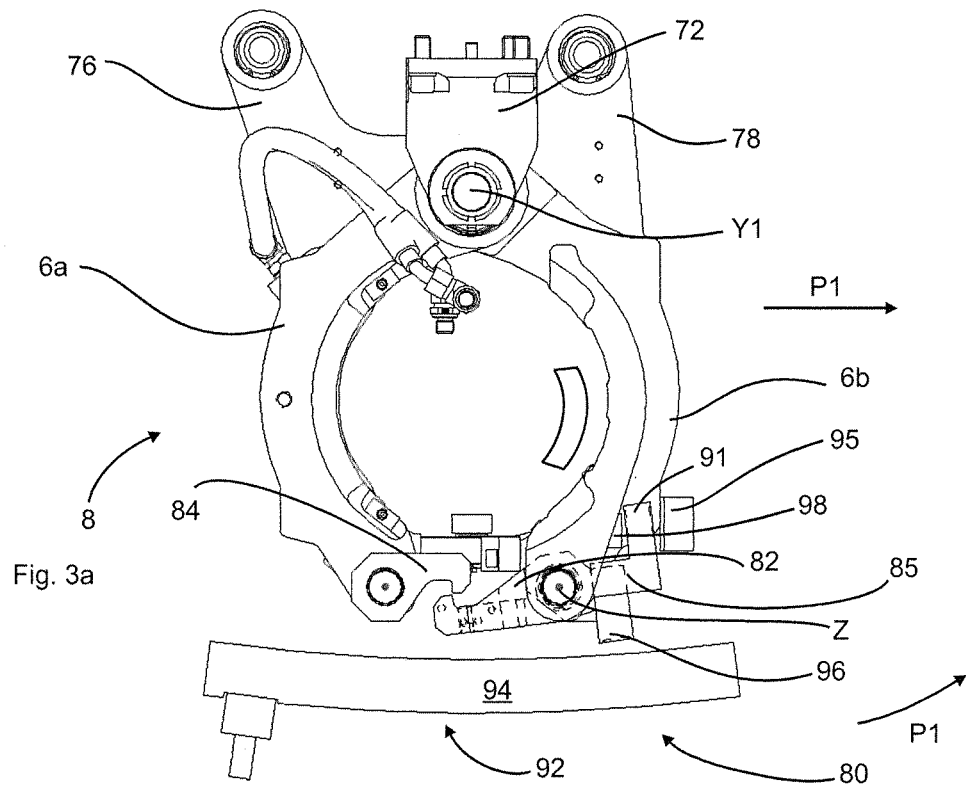
FIGS. 3a, b are two illustrations of an apparatus according to the invention.
Figure 3B:
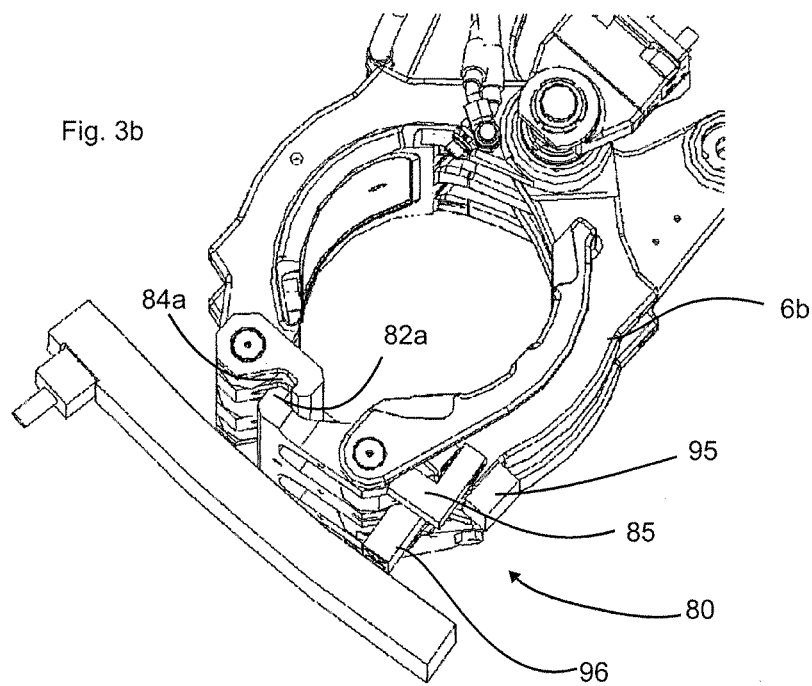

FIGS. 3a and 3b show a blow moulding station 8 according to the invention in an opened position. The first blow mould carrier part 6a and the second blow mould carrier part 6b, which are provided so as to be pivotable about a common pivot axis Y1 in order to open and close the blow moulding station, are evident here. The reference number 72 designates a carrier for carrying the blow mould carrier parts 6a, 6b, and the reference numbers 76 and 78 designate two levers which are preferably arranged in a rigid manner on the blow mould carrier parts 6a and 6b in each case. The pivoting movements of the blow mould carrier parts 6a and 6b can be produced by way of a drive mechanism (not shown). A blow mould (not shown) is received or held in the interior of the blow mould carrier parts 6a and 6b.

The reference number 82 relates to a first locking element which is arranged on the second blow mould carrier part 6b and the reference number 84 relates to a second locking element which is arranged here on the first blow mould carrier part 6a. In this case the second locking element is arranged in a rigid manner here on the first blow mould carrier part 6a, whilst the first locking element 82 is arranged so as to be pivotable about a pivot axis Z. The blow moulding station 8 is arranged here with the carrier 72 mentioned on the main carrier 2 and moves as a whole in the direction of the arrow P1.

The reference number 92 designates a magnetic element which in this case has an electromagnet 94. A further magnet 96 or a magnetic element 96 can be attracted by activating this electromagnet 94, this further magnetic element being connected in a fixed manner to the first locking element 82. On account of this attraction of the further magnetic element 96 the locking element is pivoted in the clockwise direction about the pivot axis in this case and it can thus engage in the second locking element 84. The reference number 80 designates the locking mechanism in its entirety.

Figure 4A:
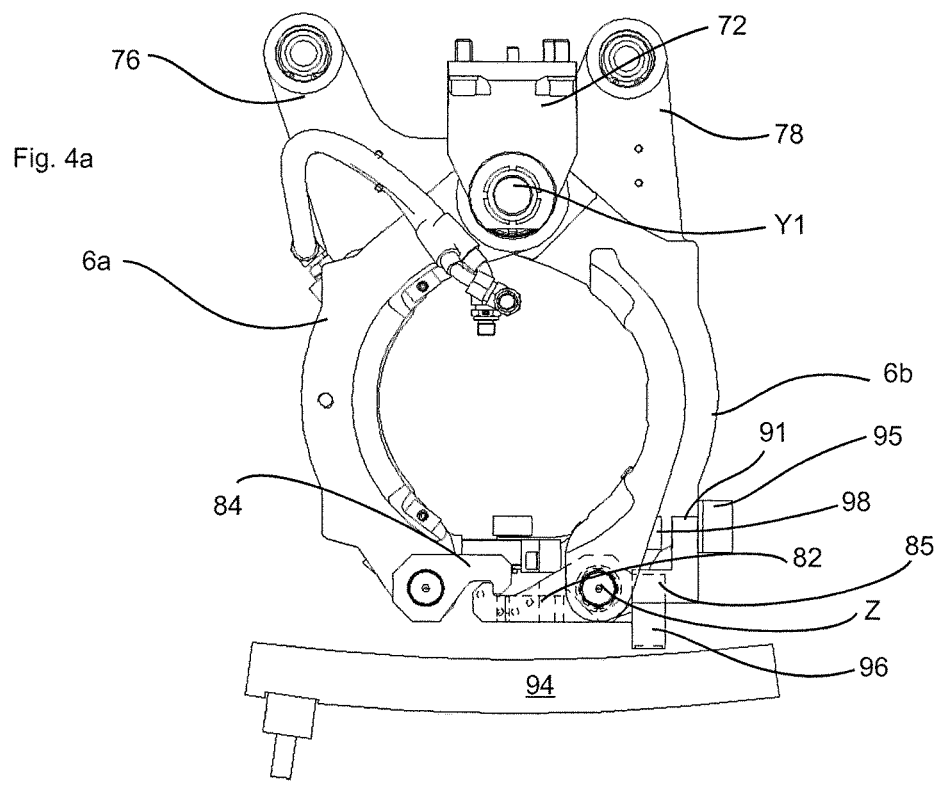
FIGS. 4a, 4b are two further views of the apparatus shown in FIG. 3.
Figure 4B:
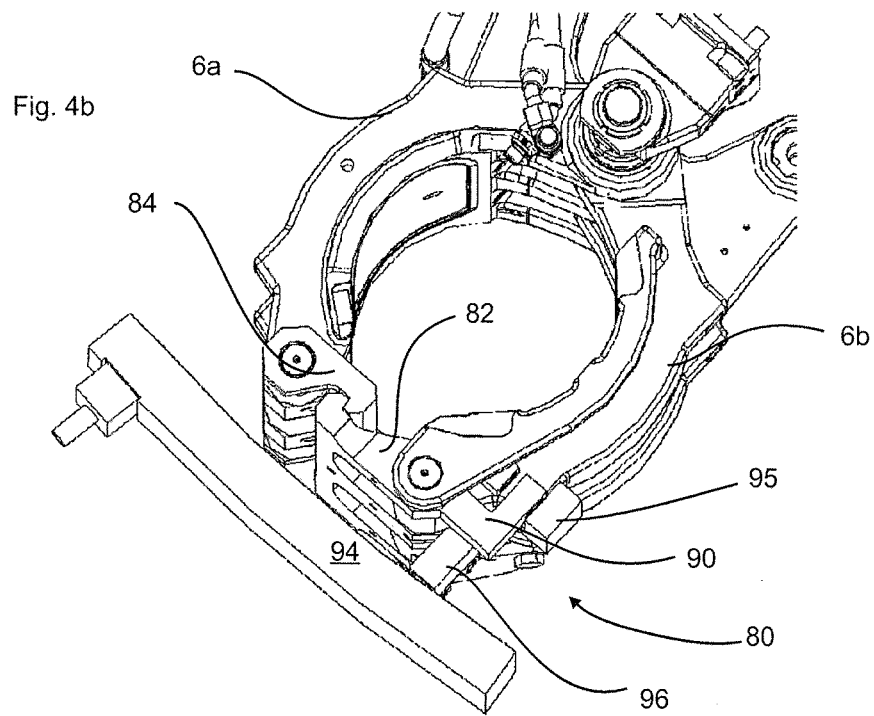

FIGS. 4a, 4b show a corresponding closed state of the blow moulding station, i.e. a state in which the first locking element 82 engages in the second locking element 84. The reference number 95 designates a holding magnet which cooperates with a magnetizable element 91, which is likewise arranged in a fixed manner on the locking element 82, and in this way holds the first locking element in the locking position with a pre-set magnetic force. This holding magnet 95 thus constitutes the second magnetic element mentioned above.

By changing the magnetization of the magnet 94 it is possible for the first locking element 82 to be pivoted in an anticlockwise direction again and for the locking to be released in this way.

In this case the individual magnetic forces can be arranged in such a way that the force of the magnet 95 can be overcome by the electromagnet 94.

The apparatus has, in addition, a further magnet 98 (the third magnetic element mentioned above) which can hold the locking element 82 in an opened position or attracts the magnet 91 as the locking element is opened, so that the locking element 82 is held in the opened position.

It is preferable in this case for the magnet 95 and/or the magnet 98 to be designed in each case in the form of a permanent magnet. In this way, it is advantageous for all the magnets which are arranged on the locking element to be designed in the form of permanent magnets here.

In order to lock the mould carrier before the blow moulding procedure in true running, a stationary electromagnet past which the mould carrier or the blow moulding station 8 moves thus attracts the pivot lever 85 and with it the locking element. In this case the pivot lever is, as mentioned, arranged on the movable locking element 82 in a fixed manner. The hook 82a of the first locking element engages in this way in the contour 84a of the second locking element 84 arranged in a fixed manner.

After leaving the electromagnetic field the outer magnet 95 holds the first locking element 82 in the locking position. In order to unlock the mould carrier (cf. FIGS. 3a, b), after the blow moulding procedure in true running, a second stationary electromagnet with an opposite polarity, past which the mould carrier moves, repels the pivot lever 85. As mentioned, the pivot lever is mounted on the first locking element 82, so that the hook 82a of the first locking element 82 pivots out of the contour 84a of the fixed second locking element. After leaving the electromagnetic field, the magnet 98 holds the first locking element in the unlocking position. Instead of the electromagnets 94 it would also be possible to use powerful permanent magnets, which have to be suitable, however, to overcome the forces of the holding permanent magnets 95 and 98 during the actuation. The advantage in using an electromagnet is that it is capable of being switched off for assembly and construction operations and, in addition, has no influence upon tools. The advantage of a permanent magnet[1] is that it requires no energy consumption.

Figure 5:
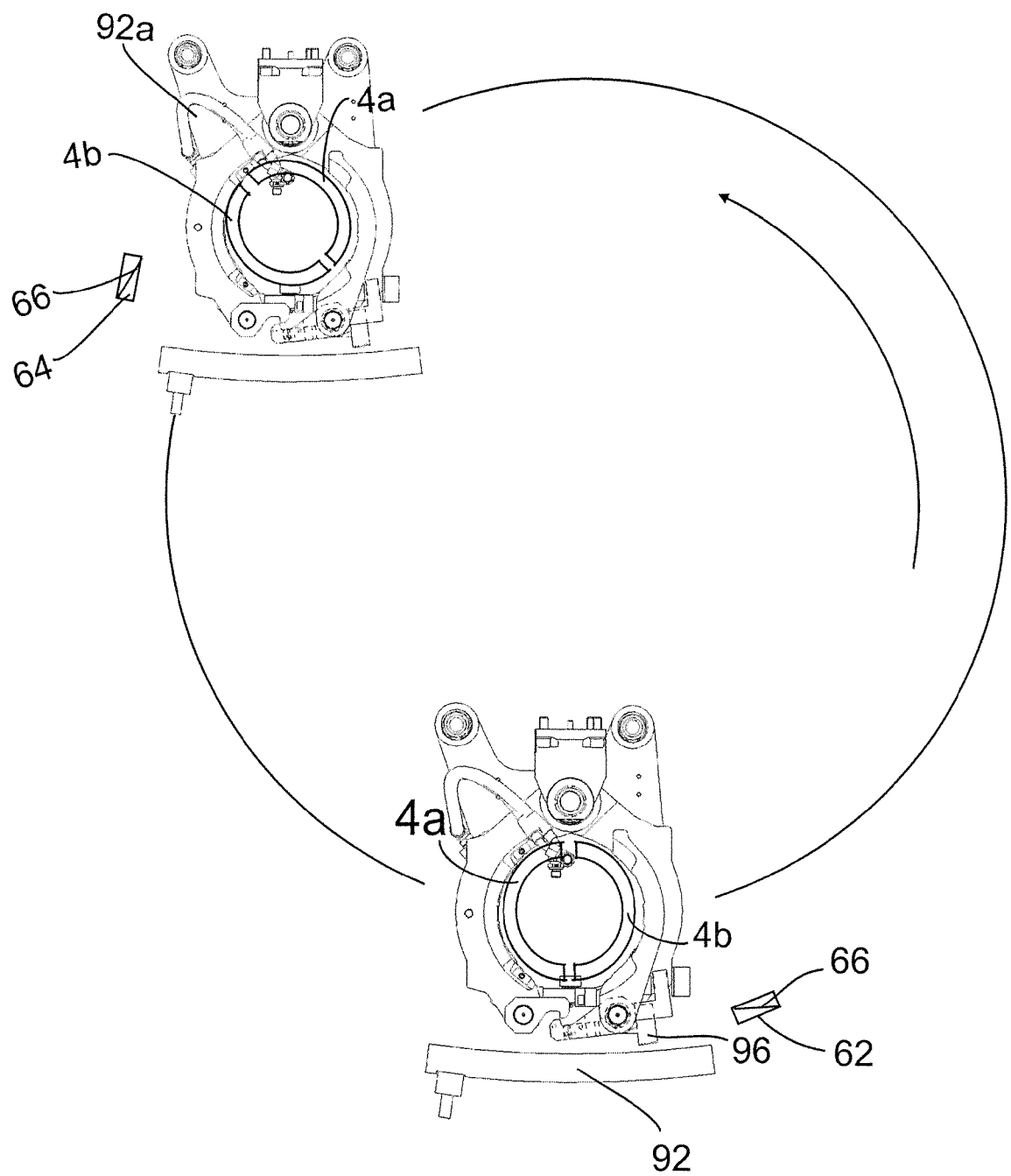
FIG. 5 is a further view of an apparatus according to the invention.

FIG. 5 is a further illustration to explain the invention. Once again a carrier or a blowing wheel 2 is shown here, on which a plurality of blow moulding stations 8 (only two shown) are arranged. In this case the first magnetic element 92 is used for opening the locking element 82, as described above, and a second magnetic element 92a is used for returning the locking element or for opening the locking so that the blow moulding station 8 can then be opened again. The references 4a, 4b relate to the blow mould parts.

The reference number 62 designates a mechanically acting movement generation element which is arranged on the conveying path P of the blow moulding stations downstream of the electromagnet 94 or the magnetic element 92. This mechanically acting movement generation element or actuator 62 produces a pivoting movement of the locking element 82 if the latter is not yet locked in the position of the magnetic element 96. For this purpose the movement generation element 62 can have an inclined face 66 which co-operates with a projection (not shown) arranged below the magnet. In this case this mechanically acting movement generation element 62 is arranged in such a way that it does not contact the magnet 96 or the aforesaid projection if the locking element 82 is already locked in this position. In this way, the mechanically acting movement generation element 62 acts as an emergency locking element in the event of failure of the magnetically acting locking.

The reference number 64 relates to a further mechanically acting movement generation element, which is arranged downstream of the second magnetic element 92a in accordance with the direction of movement of the blow moulding station 8 and is likewise used for unlocking the blow moulding station in the event that the second magnetic element has not yet set the locking element back to this position. In this way, the further mechanically acting movement generation element too contacts the magnet or the pivot lever 85 only in the event of failure of the magnetic unlocking. This second movement generation element can also have an inclined face 64 in this case.

The Applicants reserve the right to claim all the features disclosed in the application documents as being essential to the invention, insofar as they are novel either individually or in combination as compared with the prior art.

The invention claimed is:

1. An apparatus for the shaping of plastics material preforms into plastics material containers comprising: at least one blow moulding station arranged on a movable carrier, wherein this blow moulding station has a blow mould carrier for holding a blow mould and said blow mould carrier has a first blow mould carrier part and a second blow mould carrier part which is pivotable with respect to the first blow mould carrier part about a pre-set first pivot axis to open and close the blow mould, and wherein the blow moulding station additionally has a locking mechanism to lock the first blow mould carrier part with respect to the second blow mould carrier part, and the locking mechanism has a first locking element, arranged at least indirectly on the first blow mould carrier part, and a second locking element, arranged at least indirectly on the second blow mould carrier part, wherein the locking elements co-operate in a locked state of the blow mould carrier parts, wherein the apparatus has a first element which is magnetic at least for a time and with respect to which the first locking element is movable and which causes a movement of the first locking element by a magnetic interaction without contact in order to lock the blow mould carrier parts.

2. The apparatus according to claim 1, wherein the magnetic element is arranged in a stationary manner with respect to the blow moulding station.

3. The apparatus according to claim 1, wherein the magnetic element has an electromagnet.

4. The apparatus according to claim 1, wherein a second magnetic element, which holds the locking element for a time in a locking position, is provided on the blow moulding station.

5. The apparatus according to claim 1, wherein a third magnetic element which holds the first locking element for a time in a non-locked position is provided on the blow moulding station.

6. The apparatus according to claim 1, wherein the apparatus has a movement generation element which is arranged so as to be stationary and which moves the locking element.

7. The apparatus according to claim 1, wherein the apparatus has a fourth element which is magnetic at least for a time and with respect to which the first locking element is movable and which causes a movement of the first locking element by a magnetic interaction in order to unlock the blow mould carrier parts.

8. The apparatus according to claim 7, wherein the first magnetic element and the second magnetic elements are arranged at different locations along the movement path of the blow moulding station.

* * * * *